(12) United States Patent
Caras-Quintero

(10) Patent No.: US 10,011,730 B2
(45) Date of Patent: Jul. 3, 2018

(54) PRINTING INK

(71) Applicant: FujiFilm Speciality Ink Systems Limited, Broadstairs Kent (GB)

(72) Inventor: Dolores Caras-Quintero, Broadstairs Kent (GB)

(73) Assignee: Fujifilm Speciality Ink Systems Limited (GB)

( * ) Notice: Subject to any disclaimer, the term of this patent is extended or adjusted under 35 U.S.C. 154(b) by 0 days.

(21) Appl. No.: 15/126,539

(22) PCT Filed: Mar. 17, 2015

(86) PCT No.: PCT/GB2015/050782
§ 371 (c)(1),
(2) Date: Sep. 15, 2016

(87) PCT Pub. No.: WO2015/140541
PCT Pub. Date: Sep. 24, 2015

(65) Prior Publication Data
US 2017/0088731 A1    Mar. 30, 2017

(30) Foreign Application Priority Data

Mar. 20, 2014  (GB) .................................. 1405027.2
Oct. 7, 2014   (GB) .................................. 1417736.4

(51) Int. Cl.
| | | |
|---|---|---|
| C08F 2/46 | (2006.01) |
| C08F 2/50 | (2006.01) |
| C08G 61/04 | (2006.01) |
| C09D 11/38 | (2014.01) |
| C09D 11/322 | (2014.01) |
| C09D 11/36 | (2014.01) |
| C09D 11/101 | (2014.01) |
| C09D 11/107 | (2014.01) |
| C09D 133/14 | (2006.01) |
| B41J 2/01 | (2006.01) |

(52) U.S. Cl.
CPC ............... *C09D 11/38* (2013.01); *B41J 2/01* (2013.01); *C09D 11/101* (2013.01); *C09D 11/107* (2013.01); *C09D 11/322* (2013.01); *C09D 11/36* (2013.01); *C09D 133/14* (2013.01)

(58) Field of Classification Search
CPC ....... C09D 11/38; C09D 11/36; C09D 11/107; C09D 11/322; C09D 11/101; C09D 133/14; B41J 2/01
USPC ....... 522/6, 71, 1, 189, 184; 520/1
See application file for complete search history.

(56) References Cited

U.S. PATENT DOCUMENTS

| | | | | |
|---|---|---|---|---|
| 4,321,118 A | * | 3/1982 | Felder ................. | C07C 49/747 430/281.1 |
| 2005/0239971 A1 | * | 10/2005 | Husler ................. | C07C 45/46 525/293 |
| 2009/0053484 A1 | * | 2/2009 | Yoshihiro ............ | C09D 11/101 428/195.1 |
| 2009/0176072 A1 | * | 7/2009 | Ward ................... | C08J 3/28 428/195.1 |
| 2011/0065962 A1 | * | 3/2011 | Meneguzzo ......... | C07C 45/36 568/323 |
| 2012/0147095 A1 | | 6/2012 | Miura et al. | |
| 2015/0009265 A1 | * | 1/2015 | Kohzuki ............. | C09D 11/101 347/86 |
| 2015/0203696 A1 | * | 7/2015 | Loccufier ........... | C09D 11/101 428/195.1 |
| 2015/0376424 A1 | * | 12/2015 | Illsley ................ | C09D 11/101 428/211.1 |
| 2016/0200924 A1 | * | 7/2016 | De Mondt .......... | B41J 2/01 428/195.1 |

FOREIGN PATENT DOCUMENTS

| | | | |
|---|---|---|---|
| EP | 1 988 131 A1 | 11/2008 | |
| EP | 2 302 007 A1 | 3/2011 | |
| EP | 2 345 703 A1 | 7/2011 | |
| JP | 2006 348201 A | 12/2006 | |
| JP | 2006348201 | * 12/2006 | |
| WO | WO-2014032968 A1 | * 3/2014 | ........ C09D 11/101 |
| WO | WO-2014129461 A1 | * 8/2014 | ........ C09D 11/101 |
| WO | WO-2014165323 A1 | * 10/2014 | ........ B41M 7/0045 |

OTHER PUBLICATIONS

Ye et al, Low VOC bifunctional photoinitiator based on alpha-hydroxyalkylphenone structure, Mar. 16, 2006, Polymer 47, 4603-4612 (Year: 2006).*
Ye et al, Photoinitiating behavior of bifunctional photoinitiator containing alpha-hydroxyalkylphenone Group on free-radical polymerization, Apr. 26, 2006, Journal of Applied Polymer Science, vol. 102, 5297-5302 (Year: 2006).*
Dieltin et al, Reactivity and efficiency of Difunctional Radical Photoinitiators, Jun. 1, 2007, Journal of Applied Science, vol. 107, 246-252 (Year: 2007).*
International Search Report for corresponding application No. PCT/GB2015/050782 dated May 29, 2015.

* cited by examiner

*Primary Examiner* — Jessica Whiteley
(74) *Attorney, Agent, or Firm* — Wood, Phillips, Katz, Clark & Mortimer

(57) ABSTRACT

The present invention provides an inkjet ink comprising a cyclic monofunctional (meth)acrylate monomer and a free radical photoinitiator package, which package includes a free radical photoinitiator having the following structure:

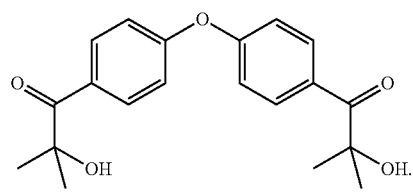

15 Claims, No Drawings

PRINTING INK

FIELD OF THE INVENTION

The present invention relates to a printing ink, and in particular to an inkjet ink having improved cure properties.

BACKGROUND OF THE INVENTION

In inkjet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically below 100 mPas at 25° C. although in most applications the viscosity should be below 50 mPas, and often below 25 mPas. Typically, when ejected through the nozzles, the ink has a viscosity of less than 25 mPas, preferably 5-15 mPas and ideally 10.5 mPas at the jetting temperature which is often elevated to about 40° C. (the ink might have a much higher viscosity at ambient temperature). The inks must also be resistant to drying or crusting in the reservoirs or nozzles. For these reasons, inkjet inks for application at or near ambient temperatures are commonly formulated to contain a large proportion of a mobile liquid vehicle or solvent.

In one common type of inkjet ink this liquid is water—see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents—see, for example, EP 0 314 403 and EP 0 424 714. Unfortunately, inkjet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of inkjet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such inkjet inks it is necessary to use monomers possessing a low viscosity.

Inkjet inks based on curable components can contain monofunctional and multifunctional components. The monofunctional components are typically soft, flexible and provide good adhesion properties while multifunctional components typically provide good cure and surface hardness. A combination of monofunctional and multifunctional components is often needed to provide a good balance of properties. However, the use of monofunctional components in an ink often leads to problems. More specifically, the use of monofunctional monomers, and in particular, cyclic monofunctional (meth)acrylate monomers such as PEA and CTFA, often leads to problems in the film after exposure to radiation because some uncured monomers remain in the film after exposure to radiation. One such problem associated with an incomplete cure of the film after exposure to radiation is odour issues. This is particularly a problem for inks which comprise cyclic monofunctional (meth)acrylate monomers, such as PEA and CTFA, which are necessary to provide advantageous properties to the ink but often remain uncured in the film after exposure to radiation. Such uncured monomers a free to move in the film which causes problems, such as the release of an undesirable odour. This is less of a problem in inks comprising multifunctional monomers as most multifunctional monomers crosslink or at least partially crosslink on exposure to radiation owing to an increased number of functional groups present in the monomer which can react. This means that the crosslinked multifunctional monomers are bound within or to the film, meaning that the film is more fully cured and hence do not suffer the problems associated with an incomplete cure of the film. This is in contrast to monofunctional monomers, which often remain uncrosslinked in the film after exposure to radiation, meaning that they are present as a liquid in the film and result in problems associated with an incomplete cure, such as an undesirable odour in the film. Monofunctional monomers are however necessary to provide other desirable properties. In this regard, an ink which comprises only multifunctional monomers is often brittle.

In order to prevent such issues with inks comprising monofunctional monomers and particularly cyclic monofunctional (meth)acrylate monomers, photoinitiator packages have been designed which often include many photoinitiators in the ink, for example, a five component photoinitiator package is often needed to ensure that more of the monofunctional monomers are cured and hence reduce the problems associated with an incomplete cure, such as odour problems. Such multi-photoinitiator systems are not desirable owing to the complexity and expense of such systems. Furthermore, photoinitiators can also release unwanted odours.

There is therefore a need in the art for an inkjet ink that comprises a cyclic monofunctional (meth)acrylate monomer but reduces the problems associated with an incomplete cure after exposure to radiation, such as odour issues after curing of the ink, maintains the advantageous properties of an inkjet ink comprising a cyclic monofunctional (meth)acrylate monomer and can achieve such advantages using fewer photoinitiators.

BRIEF SUMMARY OF THE INVENTION

Accordingly, the present invention provides an inkjet ink comprising a cyclic monofunctional (meth)acrylate monomer and a free radical photoinitiator package, which package includes a free radical photoinitiator having the following structure:

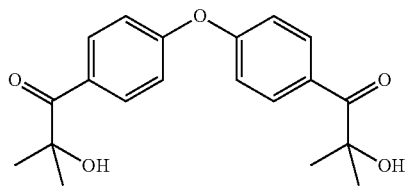 [SMILES: CC(C)(O)C(=O)c1ccc(Oc2ccc(C(=O)C(C)(C)O)cc2)cc1]

The inventors have surprising found that an inkjet ink, which comprises a cyclic monofunctional (meth)acrylate monomer, undergoes a more complete cure after exposure to radiation when the specific photoinitiator as claimed is present. This means that the problems associated with an incomplete cure after exposure to radiation, such as odour issues, are reduced. It is also possible to maintain other advantageous properties of the ink. Further, the addition of such a photoinitiator simplifies the system as fewer photoinitiators are necessary and a full cure is still possible.

The ink of the present invention comprises a cyclic monofunctional (meth)acrylate monomer.

Monofunctional (meth)acrylate monomers are well known in the art and are preferably the esters of acrylic acid. A detailed description is therefore not required.

Monomers typically have a molecular weight of less than 600, preferably more than 200 and less than 450. They typically have a viscosity of less than 2 mPas at 25° C. Monomer viscosities can be measured using an ARG2 rheometer manufactured by T.A. Instruments, which uses a 40 mm oblique/2° steel cone at 60° C. with a shear rate of 25 s$^{-1}$.

The substituents of the cyclic monofunctional (meth)acrylate monomer are not limited other than by the constraints imposed by the use in an ink-jet ink, such as viscosity, stability, toxicity etc.

The substituents of the cyclic monofunctional (meth)acrylate monomer are typically cycloalkyl, aryl and combinations thereof, any of which may be interrupted by heteroatoms and/or substituted by alkyl. Non-limiting examples of substituents commonly used in the art include $C_{3-15}$ cycloalkyl, $C_{6-10}$ aryl and combinations thereof, any of which may substituted with alkyl (such as $C_{1-18}$ alkyl) and/or any of which may be interrupted by 1-10 heteroatoms, such as oxygen or nitrogen, with nitrogen further substituted by any of the above described substituents. The substituents may together also form a cyclic structure.

Preferably, the cyclic monofunctional (meth)acrylate monomer is selected from phenoxyethyl acrylate (PEA), cyclic TMP formal acrylate (CTFA), isobornyl acrylate (IBOA), tetrahydrofurfuryl acrylate (THFA) and mixtures thereof. The preferred examples of cyclic monofunctional (meth)acrylate monomers have the following chemical structures:

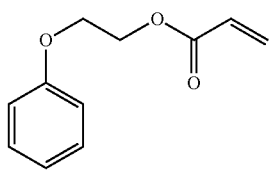

Phenoxyethyl acrylate (PEA),
mol wt 192 g/mol

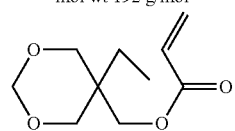

Cyclic TMP formal acrylate
(CTFA), mol wt 200 g/mol

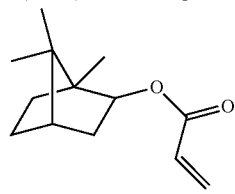

Isobornyl acrylate (IBOA)
mol wt 208 g/mol

-continued

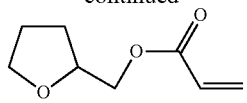

Tetrahydrofurfuryl acrylate
(THFA) mol wt 156 g/mol

Mixtures of (meth)acrylates may be used.

In a particularly preferred embodiment, the cyclic monofunctional (meth)acrylate monomer is selected from phenoxyethyl acrylate (PEA), cyclic TMP formal acrylate (CTFA) and combinations thereof.

Preferably, the ink comprises 10-50% by weight, preferably 25-40% by weight, of a cyclic monofunctional (meth)acrylate monomer, based on the total weight of the ink.

Preferably, the ink comprises 10-50% by weight, preferably 25-40% by weight, of PEA, CTFA or a combination thereof, based on the total weight of the ink.

DETAILED DESCRIPTION OF THE INVENTION

The ink of the present invention comprises a free radical photoinitiator package, which includes a free radical photoinitiator having the following structure:

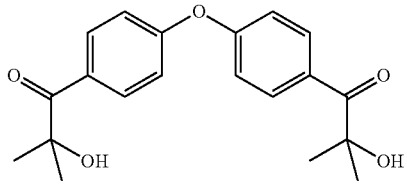 [SMILES: CC(C)(O)C(=O)c1ccc(Oc2ccc(C(=O)C(C)(C)O)cc2)cc1]

This free radical photoinitiator is a difunctional alpha-hydroxy ketone photoinitiator. It is available commercially as Esacure KIP 160. Therefore, by KIP 160 herein, we mean a difunctional alpha-hydroxy ketone photoinitiator having the following structure:

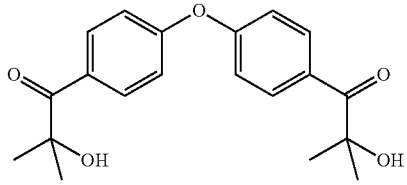 [SMILES: CC(C)(O)C(=O)c1ccc(Oc2ccc(C(=O)C(C)(C)O)cc2)cc1]

The inventors have surprisingly found that the presence of KIP 160 in the inkjet ink of the present invention means that it is possible to reduce the number of photoinitiators needed in the ink to provide a full cure. Less odour is also released from the ink of the present invention, which comprises a cyclic monofunctional (meth)acrylate monomer, after curing. Without wishing to be bound by theory, it is believed that the photoinitiator which is present in the ink of the present invention allows for the more complete cure of the cyclic monofunctional (meth)acrylate monomers in the ink. This in turn reduces the problems associated with an incomplete cure after exposure to radiation, such as reducing unwanted odour of the cured film.

The free radical photoinitiator package may comprise a plurality of free radical photoinitiators, but a benefit of the present invention is that this number may be reduced. In order to provide the required cured film properties, it is necessary to obtain sufficient cure on the surface of the film and through the film. Therefore, the total number of free radical photoinitiators present may be from two to five. Preferably the free radical photoinitiator package has two free radical photoinitiators and no more. Thus, the inkjet ink comprises a two-component free radical photoinitiator package. The second photoinitiator is present to assist in the overall curing and to help to provide a fully cured film.

The additional free radical photoinitiators (i.e. other than KIP 160) are not limited and can be selected from any free radical photoinitiator known in the art. For example, benzophenone, 1-hydroxycyclohexyl phenyl ketone, 1-[4-(2-hydroxyethoxy)-phenyl]-2-hydroxy-2-methyl-1-propane-1-one, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure and Darocur (from Ciba) and Lucerin (from BASF). Preferably, the additional free radical photoinitiator is TPO.

Preferably, the inkjet ink of the present invention comprises the free radical photoinitiator package in an amount from 1 to 20% by weight, preferably 2-18% by weight, more preferably, 5-15% by weight, based on the total weight of the ink.

In a preferred embodiment, the inkjet ink comprises a free radical photoinitiator package which comprises KIP 160 in an amount of at least 20% by weight, preferably 30-50% by weight, based on the total weight of the photoinitiator package.

In a preferred embodiment, the inkjet ink comprises an additional radiation-curable component. By "radiation-curable" is meant a material that polymerises or crosslinks when exposed to actinic radiation, commonly ultraviolet light, in the presence of a photoinitiator.

The additional radiation-curable component can be selected from an acyclic-hydrocarbon monofunctional (meth)acrylate monomer, a multifunctional (meth)acrylate monomer, a radiation-curable oligomer, an α,β-unsaturated ether monomer, an N-vinyl amide, an N-(meth)acryloyl amine and combinations thereof.

Preferably, the additional radiation-curable component comprises a multifunctional (meth)acrylate monomer (preferably a difunctional (meth)acrylate monomer), a radiation-curable oligomer or a combination thereof.

In a preferred embodiment, the ink comprises 25-80% by weight of a multifunctional (meth)acrylate monomer (preferably difunctional (meth)acrylate monomer), based on the total weight of the ink.

Multifunctional (meth)acrylate monomers are well known in the art and a detailed description is therefore not required. They have a functionality of two or higher. Functionalities of two, three or four are preferred and preferably the multifunctional (meth)acrylate monomer is a difunctional or trifunctional monomer.

Examples of the multifunctional acrylate monomers that may be included in the ink include hexanediol diacrylate, trimethylolpropane triacrylate, pentaerythritol triacrylate, polyethylene glycol diacrylate (for example tetraethylene glycol diacrylate), dipropylene glycol diacrylate, tri(propylene glycol) triacrylate, neopentyl glycol diacrylate, bis(pentaerythritol) hexaacrylate, 3-methyl pentanediol diacrylate, and the acrylate esters of ethoxylated or propoxylated glycols and polyols, for example, propoxylated neopentyl glycol diacrylate, ethoxylated trimethylolpropane triacrylate, and mixtures thereof.

In addition, suitable multifunctional methacrylate monomers also include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate and mixtures thereof.

Preferably, the multifunctional (meth)acrylate monomers is selected from propoxylated neopentyl glycol diacrylate, ethoxylated trimethylolpropane triacrylate, dipropylene glycol diacrylate, tripropylene glycol diacrylate and mixtures thereof.

Preferably, the ink comprises 25-50% by weight of a difunctional (meth)acrylate monomer, based on the total weight of the ink.

The ink of the present invention preferably also includes a radiation-curable (i.e. polymerisable) oligomer, such as a (meth)acrylate oligomer.

The term "curable oligomer" has its standard meaning in the art, namely that the component is partially reacted to form a pre-polymer having a plurality of repeating monomer units, which is capable of further polymerisation. The oligomer preferably has a molecular weight of at least 450 and preferably at least 600. The molecular weight is preferably 4,000 or less. Molecular weights (number average) can be calculated if the structure of the oligomer is known or molecular weights can be measured using gel permeation chromatography using polystyrene standards.

The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6.

Radiation-curable oligomers comprise a backbone, for example a polyester, urethane, epoxy or polyether backbone, and one or more radiation-curable groups. The oligomer preferably comprises a urethane backbone. The polymerisable group can be any group that is capable of polymerising upon exposure to radiation. Preferably the oligomers are (meth)acrylate oligomers.

Particularly preferred radiation-curable oligomers are urethane acrylate oligomers as these have excellent adhesion and elongation properties. Most preferred are di-, tri-, tetra-, penta- or hexa-functional urethane acrylates, particularly difunctional urethane acrylate or hexafunctional urethane acrylates as these yield films with good solvent resistance.

Other suitable examples of radiation-curable oligomers include epoxy based materials such as bisphenol A epoxy acrylates and epoxy novolac acrylates, which have fast cure speeds and provide cured films with good solvent resistance.

In one embodiment the radiation-curable oligomer polymerises by free-radical polymerisation.

The radiation-curable oligomer used in the ink of the invention cures upon exposure to radiation in the presence of a photoinitiator to form a crosslinked, solid film.

The total amount of the oligomer is preferably from 1 to 12 wt %, based on the total weight of the ink. Preferably the oligomer is present from 2 to 5 wt %, based on the total weight of the ink.

Preferably, the additional radiation-curable component comprises an acyclic-hydrocarbon monofunctional (meth)acrylate monomer.

Monofunctional (meth)acrylate monomers are well known in the art and are preferably the esters of acrylic acid. A detailed description is therefore not required. Monomers typically have a molecular weight of less than 600, preferably more than 200 and less than 450. They typically have a viscosity of less than 2 mPas at 25° C. Monomer viscosities can be measured using an ARG2 rheometer manufactured by T.A. Instruments, which uses a 40 mm oblique 2° steel cone at 60° C. with a shear rate of 25 $s^{-1}$.

The substituents of the acyclic-hydrocarbon monofunctional (meth)acrylate monomer are not limited other than by the constraints imposed by the use in an ink-jet ink, such as viscosity, stability, toxicity etc.

The substituents of the acyclic-hydrocarbon monofunctional (meth)acrylate monomer are typically alkyl, which may be interrupted by heteroatoms. A non-limiting example of a substituent commonly used in the art is $C_{1-15}$ alkyl, which may be interrupted by 1-10 heteroatoms, such as oxygen or nitrogen, with nitrogen further substituted.

Preferably, the acyclic-hydrocarbon monofunctional (meth)acrylate monomer contains a linear or branched $C_6$-$C_{20}$ group. In a preferred embodiment, the acyclic-hydrocarbon monofunctional (meth)acrylate monomer is selected from octadecyl acrylate (ODA), 2-(2-ethoxyethoxy)ethyl acrylate, tridecyl acrylate (TDA), isodecyl acrylate (IDA), lauryl acrylate and mixtures thereof.

The preferred examples of acyclic-hydrocarbon monofunctional (meth)acrylate monomers have the following chemical structures:

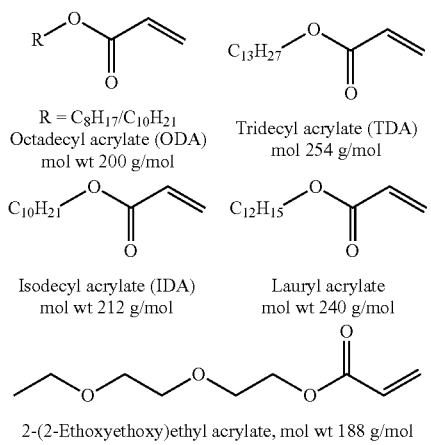

Mixtures of (meth)acrylates may be used.

(Meth)acrylate is intended herein to have its standard meaning, i.e. acrylate and/or methacrylate. Mono and difunctional are intended to have their standard meanings, i.e. one or two groups, respectively, which take part in the polymerisation reaction on curing. Multifunctional (which do not include difunctional) is intended to have its standard meanings, i.e. tri-functional or higher that is three or more groups, respectively, which take part in the polymerisation reaction on curing.

N-Vinyl amides and N-(meth)acryloyl amines may also be used in the ink. N-Vinyl amides are well-known monomers in the art and a detailed description is therefore not required. N-Vinyl amides have a vinyl group attached to the nitrogen atom of an amide which may be further substituted in an analogous manner to the (meth)acrylate monomers. Preferred examples are N-vinyl caprolactam (NVC) and N-vinyl pyrrolidone (NVP). Similarly, N-acryloyl amines are also well-known in the art. N-Acryloyl amines also have a vinyl group attached to an amide but via the carbonyl carbon atom and again may be further substituted in an analogous manner to the (meth)acrylate monomers. A preferred example is N-acryloylmorpholine (ACMO).

The ink of the present invention may further comprise an α,β-unsaturated ether monomer, which can polymerise by free-radical polymerisation and may be useful for reducing the viscosity of the ink when used in combination with one or more (meth)acrylate monomers. Examples are well known in the art and include vinyl ethers such as triethylene glycol divinyl ether, diethylene glycol divinyl ether, 1,4-cyclohexanedimethanol divinyl ether and ethylene glycol monovinyl ether. Mixtures of α,β-unsaturated ether monomers may be used.

The ink of the invention may also include radiation-curable material, which is capable of polymerising by cationic polymerisation. Suitable materials include, oxetanes, cycloaliphatic epoxides, bisphenol A epoxides, epoxy novolacs and the like. The radiation-curable material according to this embodiment may comprise a mixture of cationically curable monomer and oligomer. For example, the radiation-curable material may comprise a mixture of an epoxide oligomer and an oxetane monomer.

In the embodiment where the ink of the present invention comprises radiation-curable material, which polymerises by cationic polymerisation, the ink must also comprise a cationic photoinitiator.

In the case of a cationically curable system, any suitable cationic initiator can be used, for example sulfonium or iodonium based systems. Non limiting examples include: Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

Preferably however, the ink of the invention cures by free-radical polymerisation only and hence the ink is substantially free of radiation-curable material, which polymerises by cationic polymerisation.

The inkjet ink of the present invention dries primarily by curing, i.e. by the polymerisation of the monomers present, as discussed hereinabove, and hence is a curable ink. The ink does not, therefore, require the presence of water or a volatile organic solvent to effect drying of the ink. The absence of water and volatile organic solvents means that the ink does not need to be dried to remove the water/solvent. However, water and volatile organic solvents have a significant viscosity-lowering effect making formulation of the ink in the absence of such components significantly more challenging.

Accordingly, the inkjet ink of the present invention is preferably substantially free of water and volatile organic solvents. Preferably, the inkjet ink of the present invention comprises less than 5 wt % of water and volatile organic solvent combined, preferably less than 3% by weight combined, more preferably, less than 2% by weight combined and most preferably less than 1% by weight combined, based on the total weight of the ink. Some water will typically be absorbed by the ink from the air and solvents may be present as impurities in the components of the inks, but such low levels are tolerated.

The inks may comprise a passive (or "inert") thermoplastic resin. Passive resins are resins which do not enter into the curing process, i.e. the resin is free of functional groups which polymerise under the curing conditions to which the ink is exposed. In other words, resin is not a radiation-curable material. The resin may be selected from epoxy, polyester, vinyl, ketone, nitrocellulose, phenoxy or acrylate resins, or a mixture thereof and is preferably a poly(methyl (meth)acrylate) resin. The resin has a weight-average molecular weight of 70-200 KDa and preferably 100-150 KDa, as determined by GPC with polystyrene standards. A particularly preferred resin is Paraloid® A11 from Rohm and Haas. The resin is preferably present at 1-5% by weight, based on the total weight of the ink.

The ink of the present invention may also comprise at least one colouring agent. The colouring agent may be either dissolved or dispersed in the liquid medium of the ink. Preferably the colouring agent is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

The colorant is preferably present in an amount of 20% by weight or less, preferably 10% by weight or less, more preferably 8% by weight or less and most preferably 2 to 5% by weight, based on the total weight of the ink. A higher concentration of pigment may be required for white inks, however, for example up to and including 30% by weight, or 25% by weight based on the total weight of the ink.

The inks may be in the form of a multi-chromatic inkjet ink set, which typically comprises a cyan ink, a magenta ink, a yellow ink and a black ink (a so-called trichromatic set). The inks in a trichromatic set can be used to produce a wide range of colours and tones.

The amounts by weight provided herein are based on the total weight of the ink.

The inkjet ink exhibits a desirable low viscosity (200 mPas or less, preferably 100 mPas or less, more preferably 25 mPas or less, more preferably 10 mPas or less and most preferably 7 mPas or less at 25° C.).

In order to produce a high quality printed image a small jetted drop size is desirable. Furthermore, small droplets have a higher surface area to volume ratio when compared to larger drop sizes, which facilitates evaporation of solvent from the jetted ink. Small drop sizes therefore offer advantages in drying speed. Preferably the inkjet ink of the invention is jetted at drop sizes from 2 to 50 picolitres, preferably below 30 picolitres and most preferably below 10 picolitres.

To achieve compatibility with print heads that are capable of jetting drop sizes of 50 picolitres or less, a low viscosity ink is required. A viscosity of 30 mPas or less at 25° C. is preferred. For example, when ejected through the nozzles, the ink preferably has a viscosity of less than 25 mPas, preferably 5 to 15 mPas and ideally 10 to 11 mPas at the jetting temperature, which is often elevated to about 40° C.

Ink viscosity may be measured using a Brookfield viscometer fitted with a thermostatically controlled cup and spindle arrangement, such as a DV1 low-viscosity viscometer running at 20 rpm at 25° C. with spindle 00.

Other components of types known in the art may be present in the ink to improve the properties or performance. These components may be, for example, surfactants, defoamers, dispersants, stabilisers against deterioration by heat or light, reodorants, flow or slip aids, biocides and identifying tracers.

In one aspect of the invention the surface tension of the ink is controlled by the addition of one or more surface active materials such as commercially available surfactants. Adjustment of the surface tension of the inks allows control of the surface wetting of the inks on various substrates, for example, plastic substrates. Too high a surface tension can lead to ink pooling and/or a mottled appearance in high coverage areas of the print. Too low a surface tension can lead to excessive ink bleed between different coloured inks. The surface tension is preferably in the range of 20-32 $mNm^{-1}$ and more preferably 21-29 $mNm^{-1}$.

The ink may be prepared by known methods such as stirring with a high-speed water-cooled stirrer, or milling on a horizontal bead-mill.

The present invention also provides a method of inkjet printing using the above-described ink and a substrate having the ink cured thereon. Accordingly, the present invention further provides a method of inkjet printing comprising inkjet printing the inkjet ink as defined herein onto a substrate and curing the ink. Printing is performed by inkjet printing, e.g. on a single-pass inkjet printer, for example for printing (directly) onto a substrate, on a roll-to-roll printer or a flat-bed printer. The inks are exposed to actinic (often UV) radiation to cure the ink. The exposure to actinic radiation may be performed in an inert atmosphere, e.g. using a gas such as nitrogen, in order to assist curing of the ink.

The present invention also provides a cartridge containing the inkjet ink as defined herein. It also provides a printed substrate having the ink as defined herein printed thereon. Examples of substrates include those composed of PVC, polyester, polyethylene terephthalate (PET), PETG, polyethylene and polypropylene.

Any of the sources of actinic radiation discussed herein may be used for the irradiation of the inkjet ink. A suitable dose would be greater than 200 $mJ/cm^2$, more preferably at least 300 $mJ/cm^2$ and most preferably at least 500 $mJ/cm^2$. The upper limit is less relevant and will be limited only by the commercial factor that more powerful radiation sources increase cost. A typical upper limit would be 5 $J/cm^2$. Further details of the printing and curing process are provided in WO 2012110815.

The invention will now be described with reference to the following examples, which are not intended to be limiting.

EXAMPLES

Inkjet inks were prepared according to the formulations set out in Table 1. The inkjet ink formulations were prepared by mixing the components in the given amounts. Amounts are given as weight percentages based on the total weight of the ink.

TABLE 1

| Component | Example 1 | Example 2 | Comparative Example 1 | Comparative Example 2 |
|---|---|---|---|---|
| PEA | 40.0 | — | 40.77 | — |
| CTFA | — | 40.0 | — | 40.77 |
| DPGDA | 38.17 | 38.17 | 33.43 | 33.43 |
| Aliphatic urethane diacrylate | 4.0 | 4.0 | 6.27 | 6.27 |
| UV12 (stabiliser) | 0.30 | 0.3 | 0.30 | 0.3 |
| Cyan pigment dispersion | 4.53 | 4.53 | 4.53 | 4.53 |
| Esacure KIP 160 | 4.0 | 4.0 | — | — |
| TPO | 8.0 | 8.0 | 8.0 | 8.0 |
| Irgacure 184 | — | — | 1.88 | 1.88 |
| Benzophenone | — | — | 3.82 | 3.82 |
| BYK307 (surfactant) | 1.0 | 1.0 | 1.0 | 1.0 |
| Total | 100.0 | 100.0 | 100.0 | 100.0 |

Examples 1 and 2 are examples of the invention and have the required combination of Esacure KIP 160 and cyclic monofunctional (meth)acrylate monomer (PEA in Example 1 and CTFA in Example 2). Comparative Examples 1 and 2 fall outside the scope of the invention as they do not have Esacure KIP 160 present and use an alternative photoinitiator package.

The inks of the invention showed a better cure speed than the inks of Comparative Examples 1 and 2. Cure speed is assessed by Epson Photograph paper rubs. A strip of the Epson Paper is applied across the print and then rubbed 10 times. The strip is removed and the glossy side examined for evidence of off-setting from the print. If no off-setting occurs the full cure is achieved. If off-setting does occur then the print sample should be passed through the curing unit and re-tested with a fresh strip of Epson paper. The total number of passes that give a full cure result is recorded.

The inks of Examples 1 and 2 are also more fully cured despite the presence of PEA or CTFA, respectively, and only having two photoinitiators present. They are therefore less odorous despite having PEA or CTFA, respectively, present in the ink, which are non-low odour cyclic monofunctional (meth)acrylate monomers. They also show other beneficial film properties including a good surface and thorough cure of the film.

This is in contrast to that of Comparative Examples 1 and 2 which has a slower cure speed and are more odourous, despite having three photoinitiators present in the ink.

In order to test for odour, the following test was used:
Odour tested in accordance with DIN EN1230-1 standard for "Paper and board intended to come into contact with foodstuffs—sensory analysis (odour)". The assessor shakes the glass jar, opens it and sniffs the content immediately after opening the vessel. Specific conditions are outlined in Table 3.

TABLE 3

| | |
|---|---|
| Substrate | Coated E-flute (e.g. AbbeySheetfeeding) |
| Ink application | 12 micron layer by drawdown |
| Ink drying | UV Lamp: 2.3 W/cm$^2$, 1,700 mJ/cm$^2$ |
| Sample preparation | 6 dm$^2$ cut into squares |
| Storage conditions | 24 hours at 21° C. in sealed 500 mL glass jar |
| Assessment panel | 10 people |
| Scoring and result interpretation | 0 = no perceptible odour<br>1 = odour just perceptible (difficult to define)<br>2 = weak odour<br>3 = clear odour<br>4 = strong odour |

The results of the odour test can be seen in Table 4.

TABLE 4

| INK SAMPLE | Scoring |
|---|---|
| Example 1 | 1 = odour just perceptible (difficult to define) |
| Comparative Example 1 | 3 = clear odour |
| Example 2 | 1 = odour just perceptible (difficult to define) |
| Comparative Example 2 | 2 = weak odour |

What is claimed is:

1. An inkjet ink comprising a cyclic monofunctional (meth)acrylate monomer and a free radical photoinitiator package, which package includes a free radical photoinitiator having the following structure:

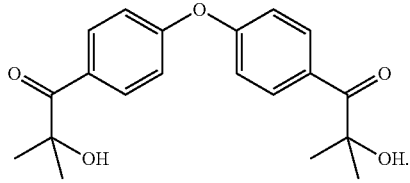 [SMILES: CC(C)(O)C(=O)c1ccc(Oc2ccc(C(=O)C(C)(C)O)cc2)cc1]

2. An inkjet ink as claimed in claim 1, wherein the ink comprises 10-50% by weight of the cyclic monofunctional (meth)acrylate monomer, based on the total weight of the ink.

3. An inkjet ink as claimed in claim 1, wherein the cyclic monofunctional (meth)acrylate monomer is selected from phenoxyethyl acrylate (PEA), cyclic TMP formal acrylate (CTFA) and combinations thereof.

4. An inkjet ink as claimed in claim 1, wherein the ink comprises 1 to 20% by weight of the free radical photoinitiator package, based on the total weight of the ink.

5. An inkjet ink as claimed in claim 1, wherein the free radical photoinitiator package has two free radical photoinitiators and no more.

6. An inkjet ink as claimed in claim 1, comprising an additional radiation-curable component.

7. An inkjet ink as claimed in claim 6, wherein the additional radiation-curable component is selected from a monofunctional (meth)acrylate monomer, a multifunctional (meth)acrylate monomer, a radiation-curable oligomer, an α,β-unsaturated ether monomer, an N-vinyl amide, an N-(meth)acryloyl amine and combinations thereof.

8. An inkjet ink as claimed in claim 7, wherein the ink further comprises: a multifunctional (meth)acrylate monomer; a radiation-curable oligomer; or a combination thereof.

9. An inkjet ink as claimed in claim 8, wherein the ink comprises 25-80% by weight of the multifunctional (meth)acrylate monomer, based on the total weight of the ink.

10. An inkjet ink as claimed in claim 1, wherein the ink further comprises a colouring agent.

11. An inkjet ink as claimed in claim 10, wherein the colouring agent is a dispersed pigment.

12. An inkjet ink as claimed in claim 1, wherein the ink is substantially free of water and volatile organic solvents.

13. A cartridge containing the inkjet ink as claimed in claim 1.

14. A printed substrate having the ink as claimed in claim 1 printed thereon.

15. A method of inkjet printing comprising inkjet printing the inkjet ink as claimed in claim 1 onto a substrate and curing the ink.

* * * * *